(12) United States Patent
Wu

(10) Patent No.: US 12,066,134 B2
(45) Date of Patent: Aug. 20, 2024

(54) VALVE CONNECTOR FOR A HIGH PRESSURE AIR PUMP

(71) Applicant: Scott Wu, Taichung (TW)

(72) Inventor: Scott Wu, Taichung (TW)

( * ) Notice: Subject to any disclaimer, the term of this patent is extended or adjusted under 35 U.S.C. 154(b) by 119 days.

(21) Appl. No.: 17/890,422

(22) Filed: Aug. 18, 2022

(65) Prior Publication Data

US 2024/0035583 A1  Feb. 1, 2024

(30) Foreign Application Priority Data

Jul. 26, 2022 (TW) .................................. 111127953

(51) Int. Cl.
*F16K 15/20* (2006.01)
*F16L 37/10* (2006.01)

(52) U.S. Cl.
CPC ............ *F16L 37/101* (2013.01); *F16K 15/20* (2013.01); *Y10T 137/3724* (2015.04)

(58) Field of Classification Search
CPC ... F04B 33/005; Y10T 137/3724; F16K 15/20
See application file for complete search history.

(56) References Cited

U.S. PATENT DOCUMENTS

| 6,382,268 B1 * | 5/2002 | Lin ......................... | F16K 15/20 141/38 |
| 8,402,987 B2 * | 3/2013 | Wang ...................... | B60S 5/043 251/149.1 |
| 8,402,989 B2 * | 3/2013 | Chuang ................. | F04B 33/005 137/231 |
| 8,757,194 B2 * | 6/2014 | Huang ................... | B60C 29/06 152/415 |

FOREIGN PATENT DOCUMENTS

TW            I546451 B       8/2016

* cited by examiner

*Primary Examiner* — Kevin F Murphy
(74) *Attorney, Agent, or Firm* — Muncy, Geissler, Olds & Lowe, P.C.

(57) ABSTRACT

A valve connector for a high pressure air pump includes an outer sleeve having opposite first and second ends. The outer sleeve includes a coupling hole extending along a rotating axis and a receiving space intercommunicating with the coupling hole and located adjacent to the first end of the outer sleeve. An abutting member includes an abutting end received in the receiving space and a connecting end opposite to the abutting end. The abutting member includes an inlet passageway intercommunicating with the abutting end and the connecting end. An outer periphery of an airtight member about the rotating axis slidably abuts and is in airtight contact with an inner periphery of the receiving space. The airtight member is movable toward the first end or the second end. The airtight end face is configured to be biased toward the first end by air current entering from the inlet passageway.

11 Claims, 8 Drawing Sheets

US 12,066,134 B2

VALVE CONNECTOR FOR A HIGH PRESSURE AIR PUMP

BACKGROUND OF THE INVENTION

The present invention relates to a valve connector and, more particularly, to a valve connector for a high pressure air pump.

Taiwan Invention Patent No. 1546451 discloses an inflator connector for a shock absorber. The inflator connector includes an intercommunicating device, an air inlet end, and an air outlet end. The intercommunicating device includes an inner tube and an outer tube. The inner tube includes an air passageway. The outer tube is rotatably fit around the inner tube. A second end of the inner tube includes an abutting portion. A valve plug is fit around the abutting portion of the inner tube and surrounds an outer periphery of the abutting portion. The air inlet end is connected to the inner tube. The air inlet end includes an inlet passageway therein intercommunicating with the air passageway of the inner tube. An end of the air inlet end away from the intercommunicating device includes a first threaded portion. An end of the air outlet end is connected to the outer tube. An end of the air outlet away from the intercommunicating device includes a second threaded portion.

The inflator connector is applicable for a shock absorber. The valve plug is squeezed and deformed during insertion of a valve into the inflator connector, forming an airtight state. At the same time, the inner tube pushes open a nozzle of the valve. However, irregular deformation of the valve plug tends to cause leakage during inflation or removal of the valve. Furthermore, the inner pressure required for operation of the shock absorber is higher than the tire pressure of the tire and has a small volume, such that the influence is significant once leakage occurs.

In view of the above drawbacks of the conventional structure, a novel valve connector for a high pressure air pump is provided to overcome all disadvantages of the conventional structure.

BRIEF SUMMARY OF THE INVENTION

The primary objective of the present invention is to provide a valve connector for a high pressure air pump. The valve connector comprises an outer sleeve, an abutting member, and an airtight member. The outer sleeve includes a first end and a second end opposite to the first end. The outer sleeve includes a coupling hole extending along a rotating axis and a receiving space intercommunicating with the coupling hole and extending along the rotating axis. The receiving space is adjacent to the first end of the outer sleeve. The abutting member includes an abutting end and a connecting end opposite to the abutting end. The abutting end is received in the receiving space and includes an abutting end face adjacent to the first end of the outer sleeve. The abutting member includes an inlet passageway intercommunicating with the abutting end and the connecting end. An outer periphery of the airtight member about the rotating axis slidably abuts and is in airtight contact with an inner periphery of the receiving space. The airtight member includes an airtight end face adjacent to an end face of the first end of the outer sleeve. The airtight member is movable between a first position and a second position along the rotating axis. The abutting end face protrudes beyond or is flush with the airtight end face when the airtight member is in the first position. When the airtight member is in the second position, the airtight end face is located between the abutting end face and the coupling hole, and the airtight end face is configured to be biased toward the second position by air current entering from the inlet passageway.

In an example, the outer sleeve includes a receiving section defined therein and extending between the first and second ends and adjacent to the second end of the outer sleeve. The abutting member extends through the receiving section. The connecting end of the abutting member is outside of the outer sleeve.

In an example, the abutting end of the abutting member has a first width perpendicular to the rotating axis. The abutting member further includes a flange between the abutting end and the connecting end. The flange has a second width perpendicular to the rotating axis. An inner periphery of the airtight member has a third width perpendicular to the rotating axis. The third width is greater than the first width and smaller than the second width.

In an example, the receiving section includes a wider section and a narrower section. A width of the narrower section perpendicular to the rotating axis is smaller than a width of the wider section perpendicular to the rotating axis. The wider section is located between the narrower section and the receiving space. The narrower section is connected to the wider section and is adjacent to the second end of the outer sleeve. The flange is received in the wider section. The connecting end extends through the narrower section to an outside of the outer sleeve.

In an example, the abutting member includes a lateral passageway extending in a radial direction perpendicular to the rotating axis. The lateral passageway is provided on the abutting end and adjacent to the flange. An end of the lateral passageway is connected to the inlet passageway. Another end of the lateral passageway intercommunicates with the receiving space.

In an example, the receiving space includes a stop face adjacent to an end of the coupling hole. The airtight member abuts the stop face when the airtight member is in the second position. The airtight member is off contact with the stop face when the airtight member is in the first position.

In an example, the outer sleeve is in the form of an integral structure. The coupling hole has a threading structure configured for coupling with an American valve.

In an example, the outer sleeve includes a first tube and a second tube. The first tube defines the coupling hole and the receiving space. The second tube defines the receiving section and is connected to the first tube.

In an example, the first tube includes an inner threading surrounding the rotating axis. The second tube includes an outer threading surrounding the rotating axis and in threading connection with the inner threading. The coupling hole has a threading structure configured for coupling with an American valve.

In an example, the outer sleeve includes a first tube and a second tube. The first tube defines the coupling hole and the receiving space. The second tube defines the receiving section and is connected to the first tube. The receiving section includes a wider section and a narrower section. A width of the narrower section perpendicular to the rotating axis is smaller than a width of the wider section perpendicular to the rotating axis. The wider section is located between the narrower section and the receiving space. The narrower section is connected to the wider section and is adjacent to the second end of the outer sleeve. The connecting end is coupled with the wider section.

In an example, an end of the narrower section opposite to the wider section is closed. An outer periphery of the second tube includes an annular recessed portion surrounding the rotating axis and a lateral hole extending in a radial direction perpendicular to the rotating axis. An end of the lateral hole is connected to the narrower section. Another end of the lateral hole is connected to the annular recessed portion. The outer sleeve further includes a third tube extending in a radial direction perpendicular to the rotating axis. An end of the third tube is rotatably coupled with the second tube. The third tube has an interior intercommunicating with the annular recessed portion.

The present invention will become clearer in light of the following detailed description of illustrative embodiments of this invention described in connection with the drawings.

DETAILED DESCRIPTION OF THE INVENTION

Figure 1:
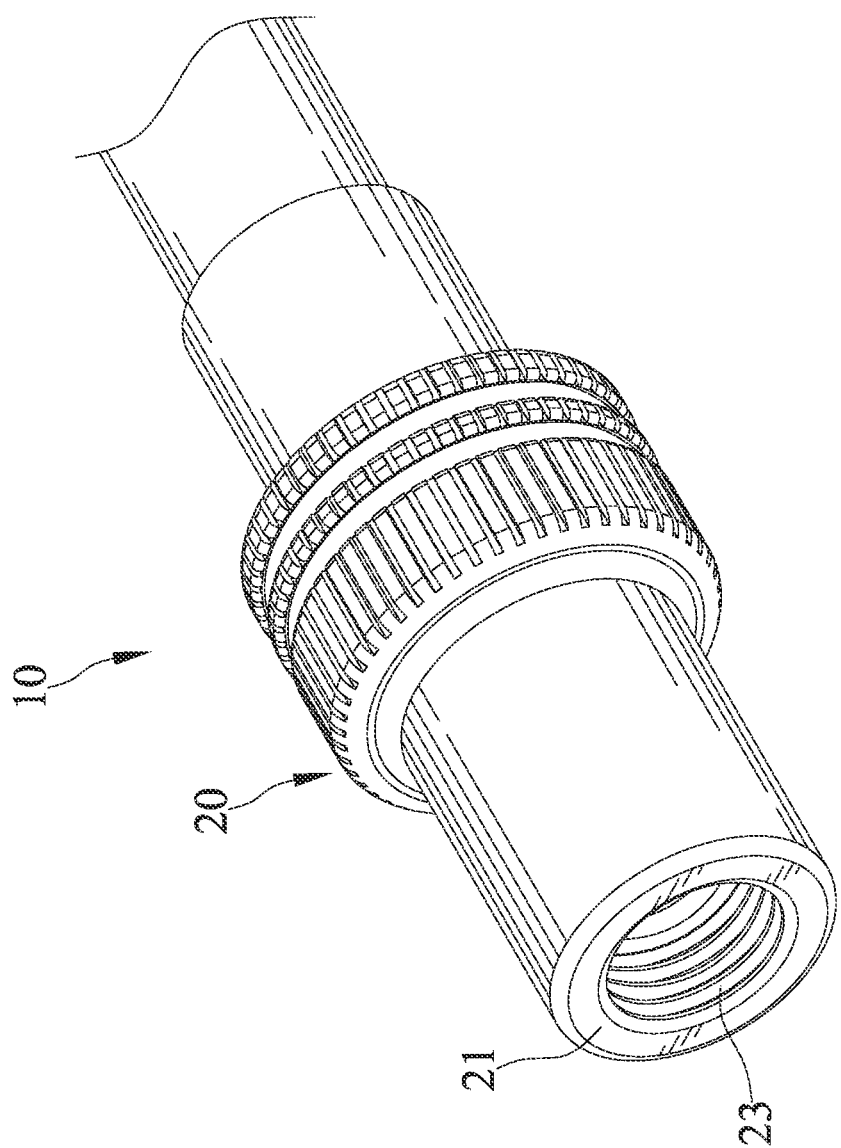
FIG. 1 is a perspective view of a valve connector for a high pressure air pump of a first embodiment according to the present invention.
Figure 2:
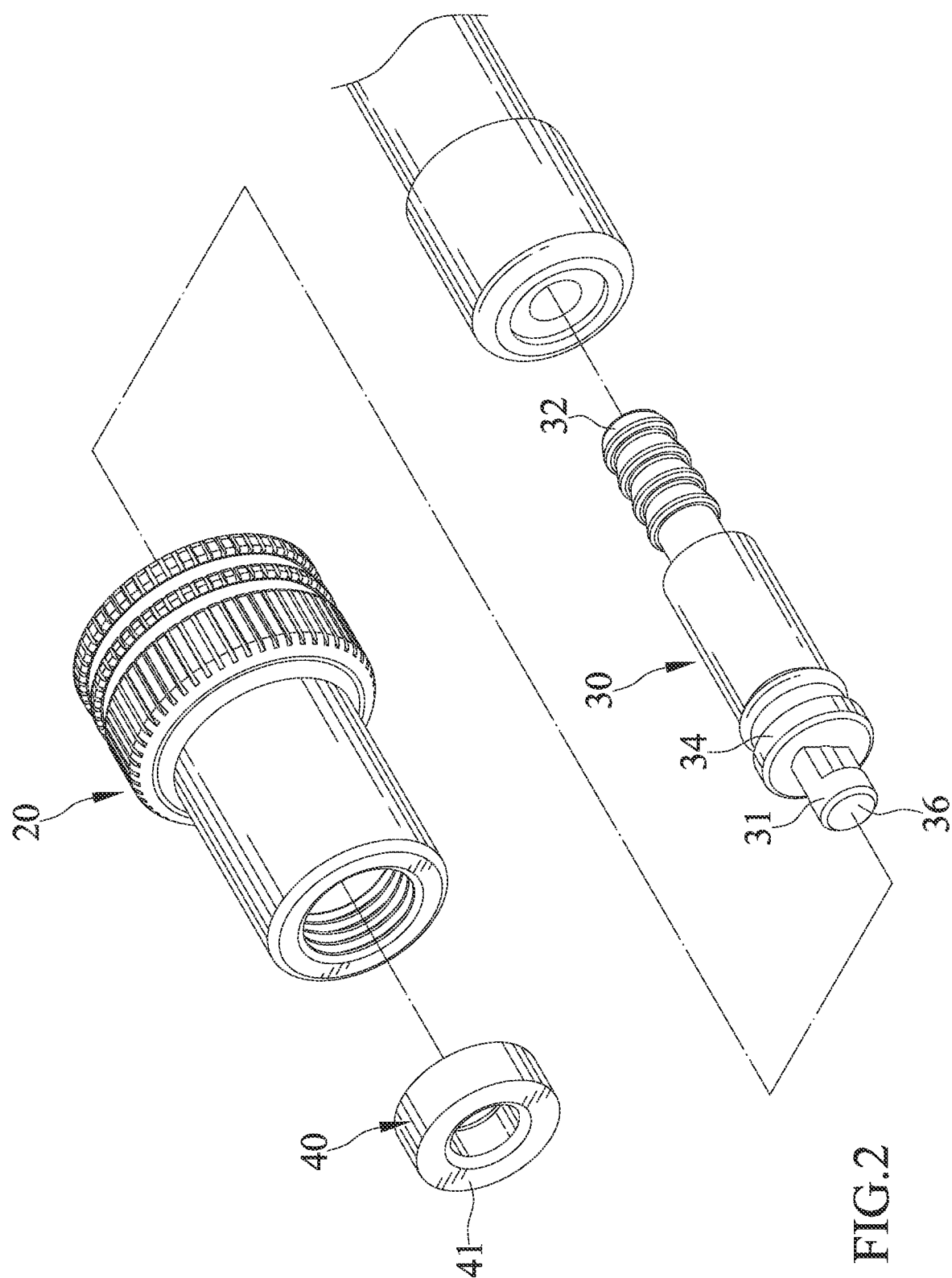
FIG. 2 is an exploded, perspective view of the valve connector for a high pressure air pump of the first embodiment according to the present invention.
Figure 3:
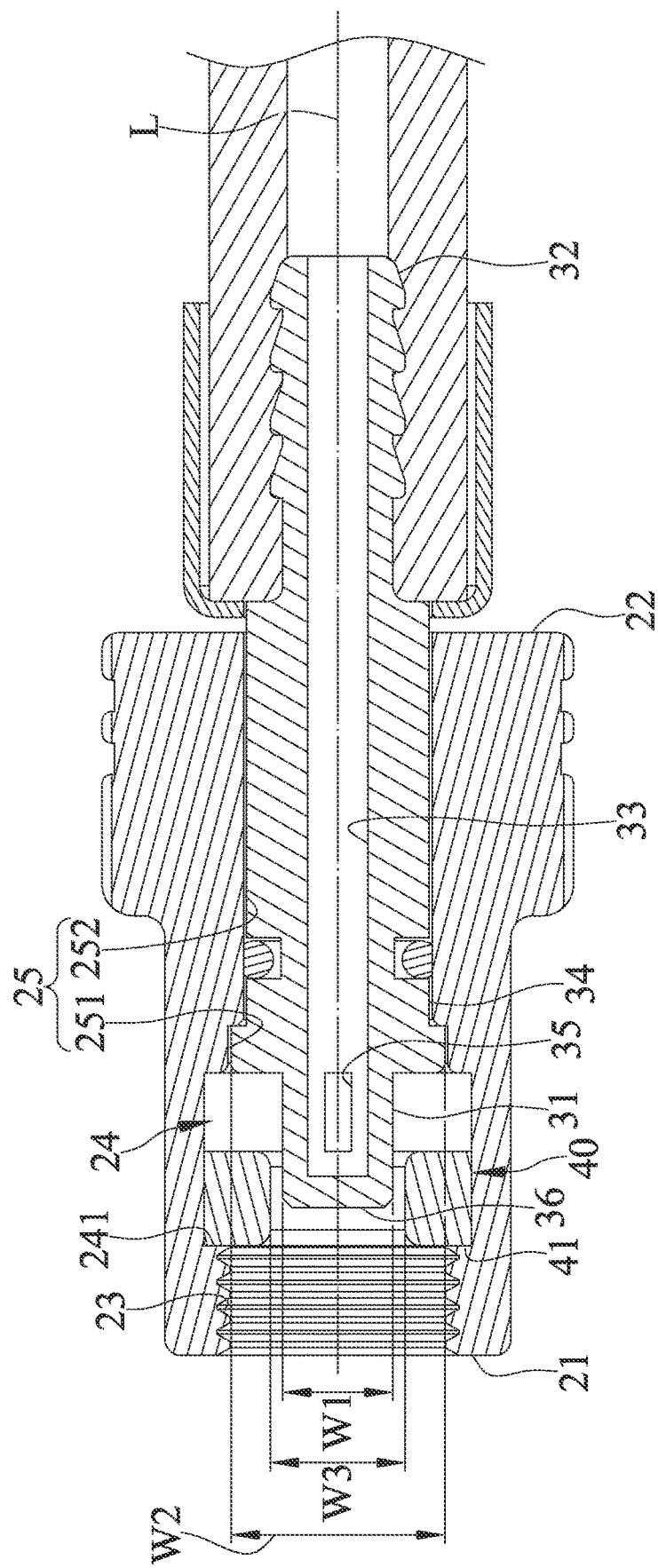
FIG. 3 is a cross sectional view of the valve connector for a high pressure air pump of the first embodiment according to the present invention.

The techniques, measures, and effects of present invention will hereinafter set forth in detail by three preferred embodiments described in connection with the drawings. The description is provided for the purpose of explanation only, and the application for patent shall not be restricted by such structures.

FIGS. 1-6 show a perspective view, an exploded perspective view, and cross sectional views of a valve connector for a high pressure air pump of a first embodiment according to the present invention. The valve connector 10 according to the present invention comprises an outer sleeve 20, an abutting member 30, and an airtight member 40.

The outer sleeve 20 includes a first end 21 and a second end 22 opposite to the first end 21. The outer sleeve 20 includes a coupling hole 23 extending along a rotating axis L and a receiving space 24 intercommunicating with the coupling hole 23 and extending along the rotating axis L. The receiving space 24 is adjacent to the first end 21 of the outer sleeve 20.

The abutting member 30 includes an abutting end 31 and a connecting end 32 opposite to the abutting end 31. The abutting end 31 is received in the receiving space 24 and includes an abutting end face 36 adjacent to the first end 21 of the outer sleeve 20. The abutting member 30 includes an inlet passageway 33 intercommunicating with the abutting end 31 and the connecting end 32.

An outer periphery of the airtight member 40 about the rotating axis L slidably abuts and is in airtight contact with an inner periphery of the receiving space 24. The airtight member 40 includes an airtight end face 41 adjacent to an end face of the first end 21 of the outer sleeve 20. The airtight member 40 is movable between a first position and a second position along the rotating axis L. The abutting end face 36 protrudes beyond or is flush with the airtight end face 41 when the airtight member 40 is in the first position. When the airtight member 40 is in the second position, the airtight end face 41 is located between the abutting end face 36 and the coupling hole 23, and the airtight end face 41 is configured to be biased toward the second position by air current entering from the inlet passageway 33.

The outer sleeve 20 includes a receiving section 25 defined therein and extending between the first and second ends 21 and 22 and adjacent to the second end 22 of the outer sleeve 20. The abutting member 30 extends through the receiving section 25. The connecting end 32 of the abutting member 30 is outside of the outer sleeve 20.

The abutting end 31 of the abutting member 30 has a first width W1 perpendicular to the rotating axis L. The abutting member 30 further includes a flange 34 between the abutting end 31 and the connecting end 32. The flange 34 has a second width W2 perpendicular to the rotating axis L. An inner periphery of the airtight member 40 has a third width W3 perpendicular to the rotating axis L. The third width W3 is greater than the first width W1 and smaller than the second width W2.

The receiving section 25 includes a wider section 251 and a narrower section 252. A width of the narrower section 252 perpendicular to the rotating axis L is smaller than a width of the wider section 251 perpendicular to the rotating axis L. The wider section 251 is located between the narrower section 252 and the receiving space 24. The narrower section 252 is connected to the wider section 251 and is adjacent to the second end 22 of the outer sleeve 20. The flange 34 is received in the wider section 251. The connecting end 32 extends through the narrower section 252 to an outside of the outer sleeve 20.

The abutting member 30 includes a lateral passageway 35 extending in a radial direction perpendicular to the rotating axis L. The lateral passageway 35 is provided on the abutting end 31 and adjacent to the flange 34. An end of the lateral passageway 35 is connected to the inlet passageway 33. Another end of the lateral passageway 35 intercommunicates with the receiving space 24.

The receiving space 24 includes a stop face 241 adjacent to an end of the coupling hole 23. The airtight member 40 abuts the stop face 241 when the airtight member 40 is in the second position. The airtight member 40 is off contact with the stop face 241 when the airtight member 40 is in the first position.

The outer sleeve 20 is in the form of an integral structure. The coupling hole 23 has a threading structure configured for coupling with an American valve 90.

Figure 4:
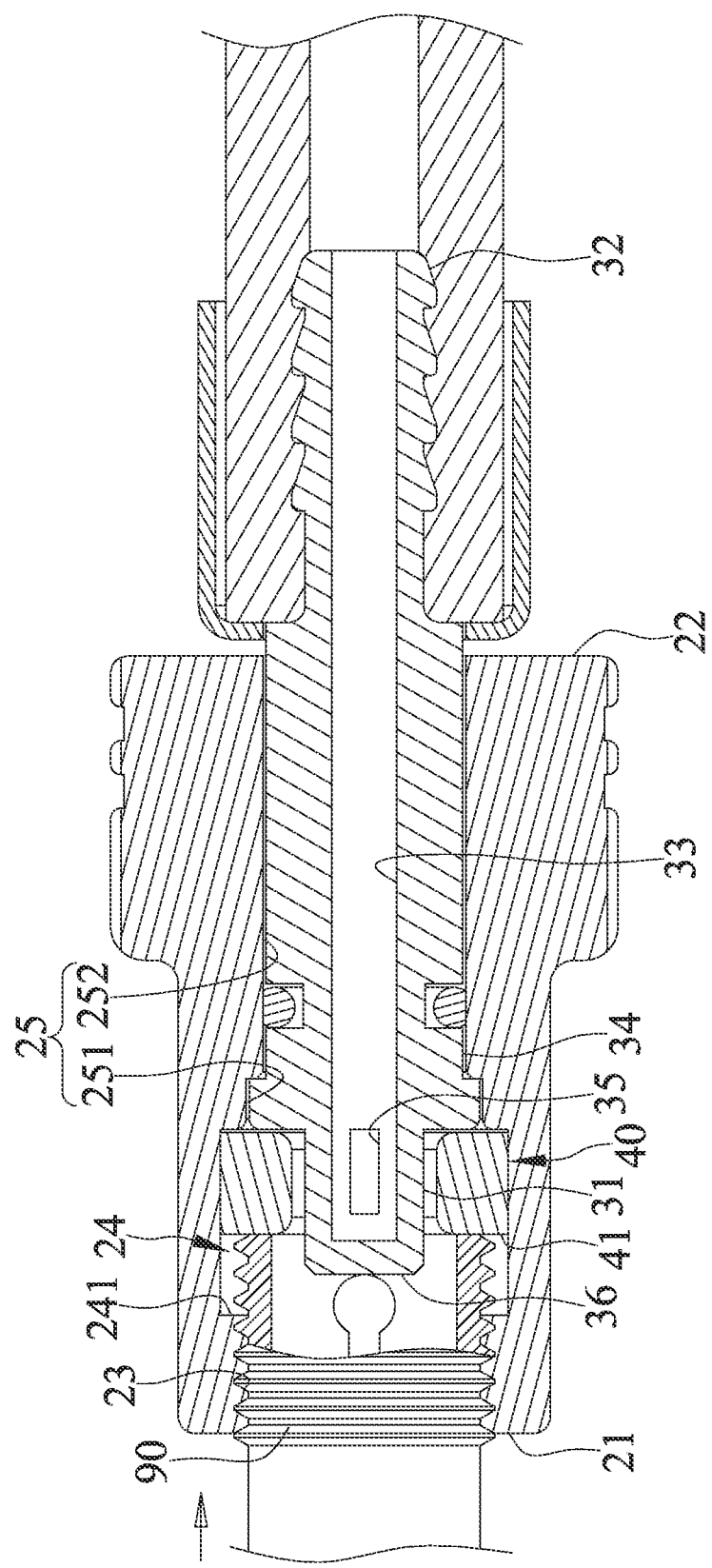
FIG. 4 is a cross sectional view illustrating insertion of a valve into the valve connector for a high pressure air pump of the first embodiment according to the present invention.
Figure 5:
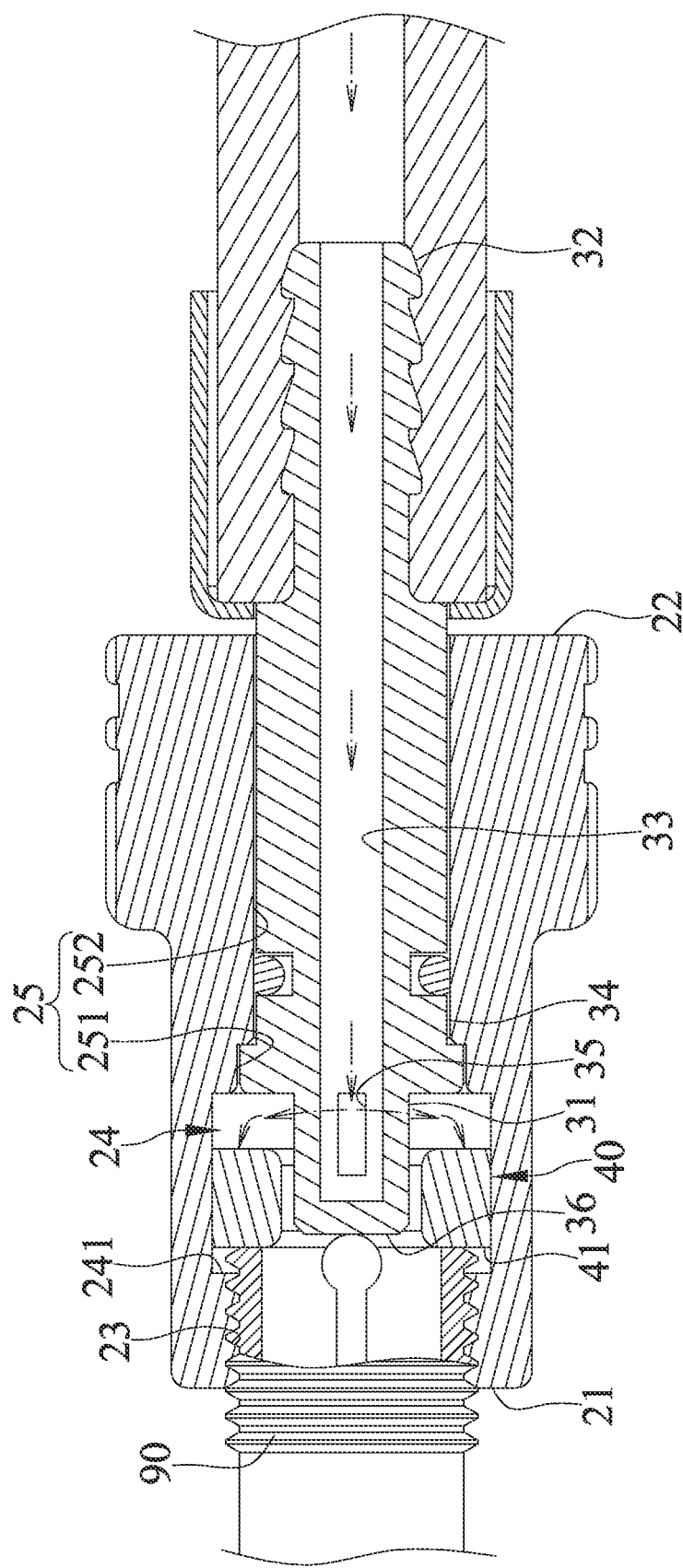
FIG. 5 is a cross sectional view illustrating removal of the valve connector for a high pressure air pump of the first embodiment according to the present invention.
Figure 6:
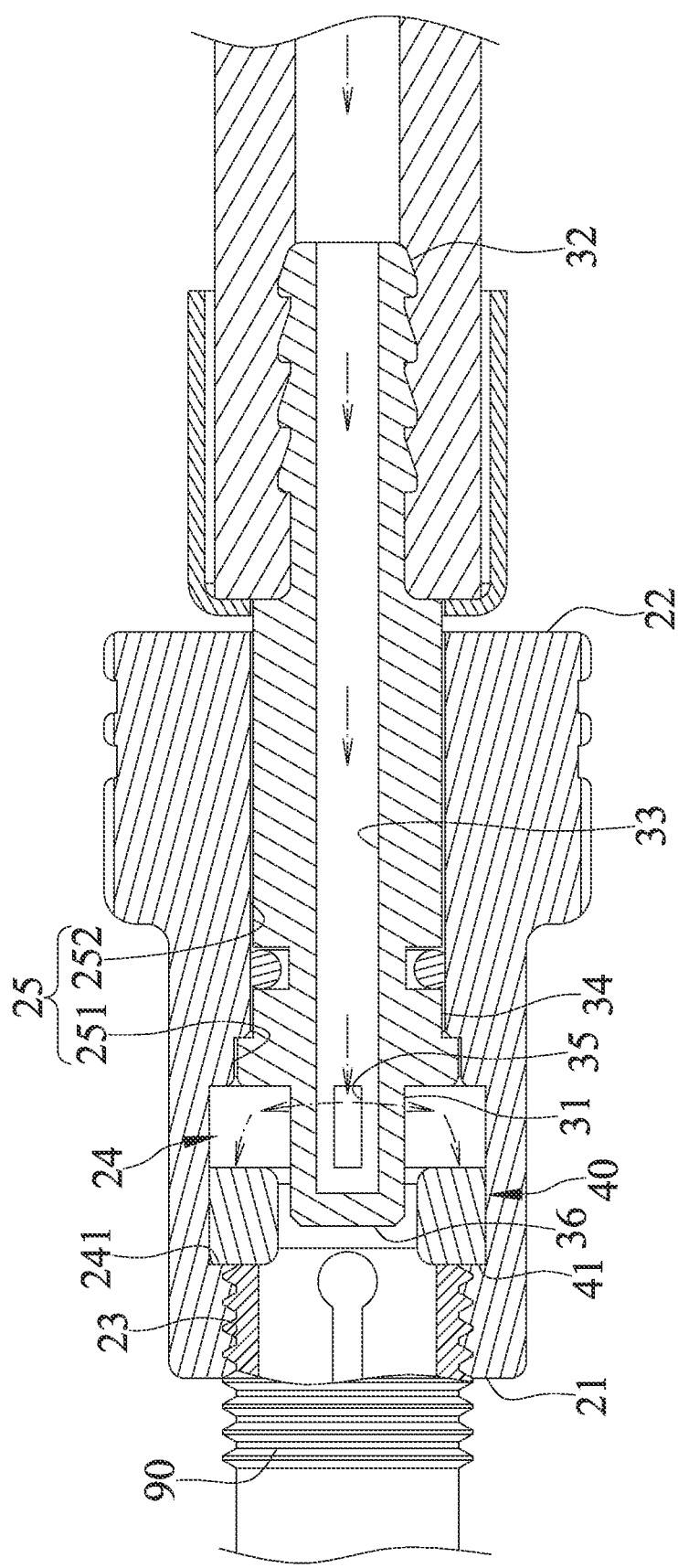
FIG. 6 is another cross sectional view illustrating removal of the valve connector for a high pressure air pump of the first embodiment according to the present invention.

The valve connector 10 provides an excellent airtight effect by the above structure. The valve connector 10 is mainly applied on a shock absorber. The air pressure in the shock absorber is high, such that leakage is apt to occur when a valve of the shock absorber is coupled with an ordinary valve connector. In use of the valve connector 10, an American valve 90 is inserted into the coupling hole 23 and then abuts the airtight member 40 and pushes the airtight member 40 towards the first position. The air pressure in the receiving space 24 enables an excellent airtight effect between the airtight member 40 and the American valve 90, as shown in FIG. 4. The airtight member 40 is difficult to deform excessively or damage due to squeezing by the American valve 90. Furthermore, after filling, the air entering the receiving space 24 via the inlet passageway 33 still has a pressure sufficient to move the airtight member 40 toward the second position (see FIGS. 5 and 6) during removal of the American valve 90, preventing the American valve 90 from leakage during the removal procedure.

Figure 7:
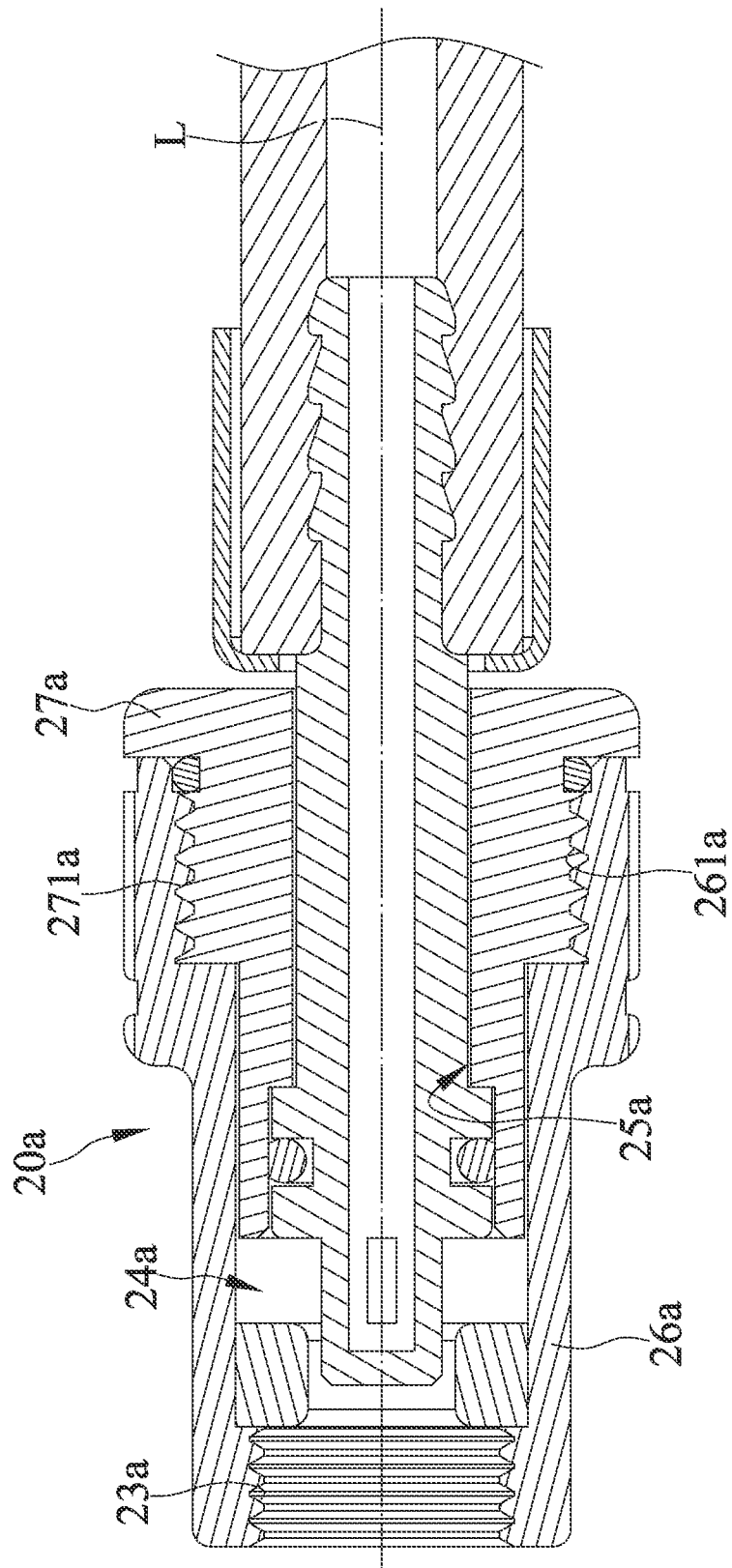
FIG. 7 is a cross sectional view of the valve connector for a high pressure air pump of a second embodiment according to the present invention.

FIG. 7 shows a cross sectional view of a valve connector for a high pressure air pump of a second embodiment according to the present invention. The second embodiment is substantially the same as the first embodiment. The main difference between the second embodiment and the first embodiment is that the outer sleeve 20a includes a first tube 26a and a second tube 27a. The first tube 26a defines the coupling hole 23a and the receiving space 24a. The second tube 27a defines the receiving section 25a and is connected to the first tube 26a.

The first tube 26a includes an inner threading 261a surrounding the rotating axis L. The second tube 27a includes an outer threading 271a surrounding the rotating axis L and in threading connection with the inner threading 261a. The coupling hole 23a has a threading structure configured for coupling with an American valve 90.

Figure 8:
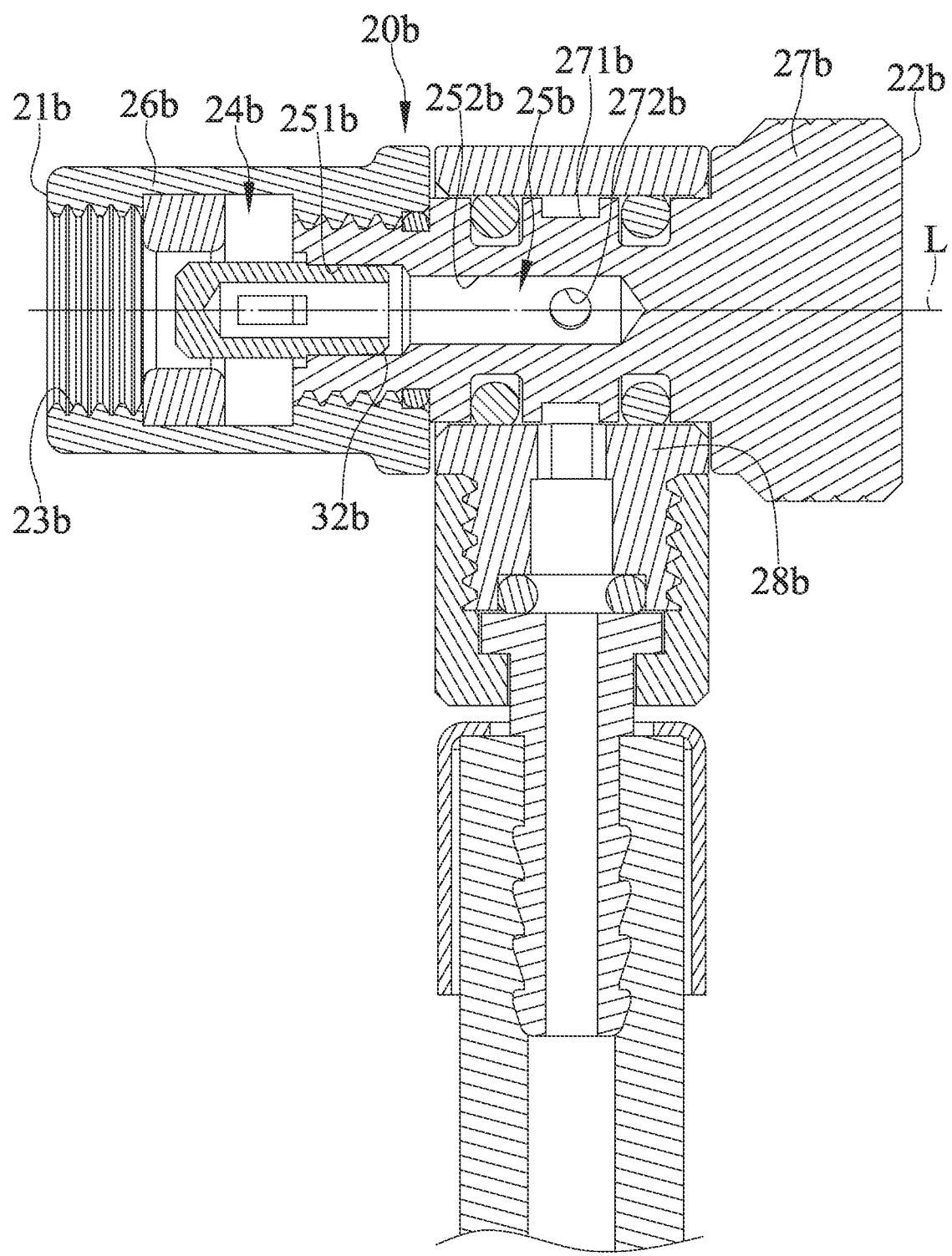
FIG. 8 is a cross sectional view of the valve connector for a high pressure air pump of a third embodiment according to the present invention.

FIG. 8 shows a cross sectional view of a valve connector for a high pressure air pump of a third embodiment according to the present invention. The third embodiment is substantially the same as the first embodiment. The main difference between the third embodiment and the first embodiment is that the outer sleeve 20b includes a first tube 26b and a second tube 27b. The first tube 26b defines the coupling hole 23b and the receiving space 24b. The second tube 27b defines the receiving section 25b and is connected to the first tube 26b. The receiving section 25b includes a wider section 251b and a narrower section 252b. A width of the narrower section 252b perpendicular to the rotating axis L is smaller than a width of the wider section 251b perpendicular to the rotating axis L. The wider section 251b is located between the narrower section 252b and the receiving space 24b. The narrower section 252b is connected to the wider section 251b and is adjacent to the second end 22b of the outer sleeve 20b. The connecting end 32b is coupled with the wider section 251b.

An end of the narrower section 252b opposite to the wider section 251b is closed. An outer periphery of the second tube 27b includes an annular recessed portion surrounding the rotating axis L and a lateral hole 272b extending in a radial direction perpendicular to the rotating axis L. An end of the lateral hole 272b is connected to the narrower section 252b. Another end of the lateral hole 272b is connected to the annular recessed portion 271b. The outer sleeve 20b further includes a third tube 28b extending in a radial direction perpendicular to the rotating axis L. An end of the third tube 28b is rotatably coupled with the second tube 27b. The third tube 28b has an interior intercommunicating with the annular recessed portion 271b.

Conclusively, the outer periphery of the airtight member 40 about the rotating axis L slidably abuts and is in airtight contact with an inner periphery of the receiving space 24. The airtight member 40 is movable toward the first end 21, 21b or the second end 22, 22b along the rotating axis L. Furthermore, the airtight end face 41 is configured to be biased toward the second position by air current entering from the inlet passageway 33. Thus, the valve connector can achieve an excellent airtight effect by the above structure.

Although specific embodiments have been illustrated and described, numerous modifications and variations are still possible without departing from the scope of the invention. The scope of the invention is limited by the accompanying claims.

The invention claimed is:

1. A valve connector for a high pressure air pump, the valve connector comprising:
an outer sleeve including a first end and a second end opposite to the first end, wherein the outer sleeve includes a coupling hole extending along a rotating axis and a receiving space intercommunicating with the coupling hole and extending along the rotating axis, and wherein the receiving space is adjacent to the first end of the outer sleeve;
an abutting member including an abutting end and a connecting end opposite to the abutting end, wherein the abutting end is received in the receiving space and includes an abutting end face adjacent to the first end of the outer sleeve, and wherein the abutting member includes an inlet passageway intercommunicating with the abutting end and the connecting end; and
an airtight member, wherein an outer periphery of the airtight member about the rotating axis slidably abuts and is in airtight contact with an inner periphery of the receiving space, wherein the airtight member includes an airtight end face adjacent to an end face of the first end of the outer sleeve, and a through hole penetrating therethrough along the rotating axis and surrounding the abutting end, wherein the airtight member is movable between a first position and a second position along the rotating axis, wherein when the airtight member is in the first position, the abutting end traverses through the through hole, resulting the abutting end face protruding beyond or being flush with the airtight end face, and wherein when the airtight member is in the second position, the airtight end face is located between the abutting end face and the coupling hole, and the airtight end face is configured to be biased toward the second position by air current entering from the inlet passageway.

2. The valve connector for the high pressure air pump as claimed in claim 1, wherein the outer sleeve includes a receiving section defined therein and extending between the first and second ends and adjacent to the second end of the outer sleeve, wherein the abutting member extends through the receiving section, and wherein the connecting end of the abutting member is outside of the outer sleeve.

3. The valve connector for the high pressure air pump as claimed in claim 2, wherein the abutting end of the abutting member has a first width perpendicular to the rotating axis, wherein the abutting member further includes a flange between the abutting end and the connecting end, wherein the flange has a second width perpendicular to the rotating axis, wherein an inner periphery of the airtight member has a third width perpendicular to the rotating axis, and wherein the third width is greater than the first width and smaller than the second width.

4. The valve connector for the high pressure air pump as claimed in claim 3, wherein the receiving section includes a wider section and a narrower section, wherein a width of the narrower section perpendicular to the rotating axis is smaller than a width of the wider section perpendicular to the rotating axis, wherein the wider section is located between the narrower section and the receiving space, wherein the narrower section is connected to the wider section and is adjacent to the second end of the outer sleeve, wherein the flange is received in the wider section, and wherein the connecting end extends through the narrower section to an outside of the outer sleeve.

5. The valve connector for the high pressure air pump as claimed in claim 4, wherein the abutting member includes a lateral passageway extending in a radial direction perpendicular to the rotating axis, wherein the lateral passageway is provided on the abutting end and adjacent to the flange, wherein an end of the lateral passageway is connected to the inlet passageway, and wherein another end of the lateral passageway intercommunicates with the receiving space.

6. The valve connector for the high pressure air pump as claimed in claim 5, wherein the receiving space includes a stop face adjacent to an end of the coupling hole, wherein the airtight member abuts the stop face when the airtight member is in the second position, and wherein the airtight member is off contact with the stop face when the airtight member is in the first position.

7. The valve connector for the high pressure air pump as claimed in claim 2, wherein the outer sleeve is in a form of an integral structure, wherein the coupling hole has a threading structure configured for coupling with an American valve.

8. The valve connector for the high pressure air pump as claimed in claim 2, wherein the outer sleeve includes a first tube and a second tube, wherein the first tube defines the coupling hole and the receiving space, and wherein the second tube defines the receiving section and is connected to the first tube.

9. The valve connector for the high pressure air pump as claimed in claim 8, wherein the first tube includes an inner threading surrounding the rotating axis, wherein the second tube includes an outer threading surrounding the rotating axis and in threading connection with the inner threading, and wherein the coupling hole has a threading structure configured for coupling with an American valve.

10. The valve connector for the high pressure air pump as claimed in claim 1, wherein the outer sleeve includes a first tube and a second tube, wherein the first tube defines the coupling hole and the receiving space, wherein the second tube defines a receiving section and is connected to the first tube, wherein the receiving section includes a wider section and a narrower section, wherein a width of the narrower section perpendicular to the rotating axis is smaller than a width of the wider section perpendicular to the rotating axis, wherein the wider section is located between the narrower section and the receiving space, wherein the narrower section is connected to the wider section and is adjacent to the second end of the outer sleeve, and wherein the connecting end is coupled with the wider section.

11. The valve connector for the high pressure air pump as claimed in claim 10, wherein an end of the narrower section opposite to the wider section is closed, wherein an outer periphery of the second tube includes an annular recessed portion surrounding the rotating axis and a lateral hole extending in a radial direction perpendicular to the rotating axis, wherein an end of the lateral hole is connected to the narrower section, wherein another end of the lateral hole is connected to the annular recessed portion, wherein the outer sleeve further includes a third tube extending in a radial direction perpendicular to the rotating axis, wherein an end of the third tube is rotatably coupled with the second tube, and wherein the third tube has an interior intercommunicating with the annular recessed portion.

\* \* \* \* \*